Dec. 26, 1939.  W. W. FARR  2,184,614
VEHICLE CONSTRUCTION
Filed April 7, 1937  2 Sheets-Sheet 2
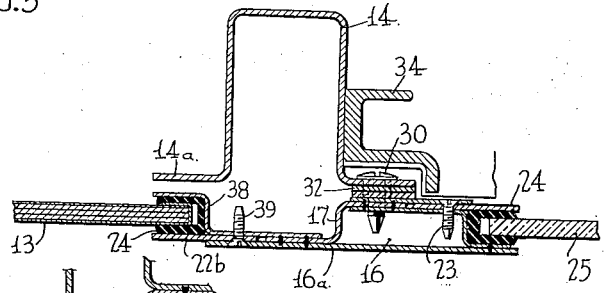
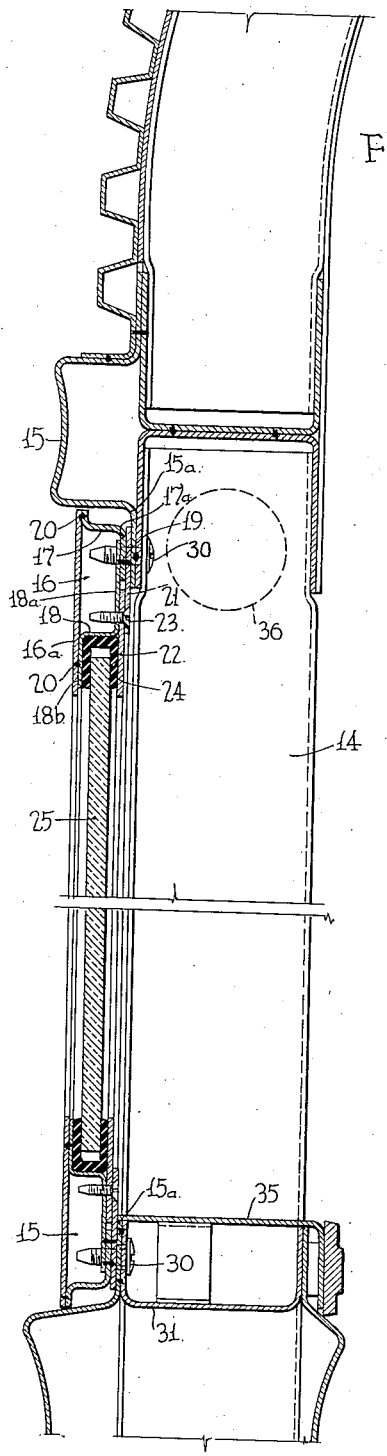
INVENTOR.
WILLIAM W. FARR.
BY
ATTORNEY.

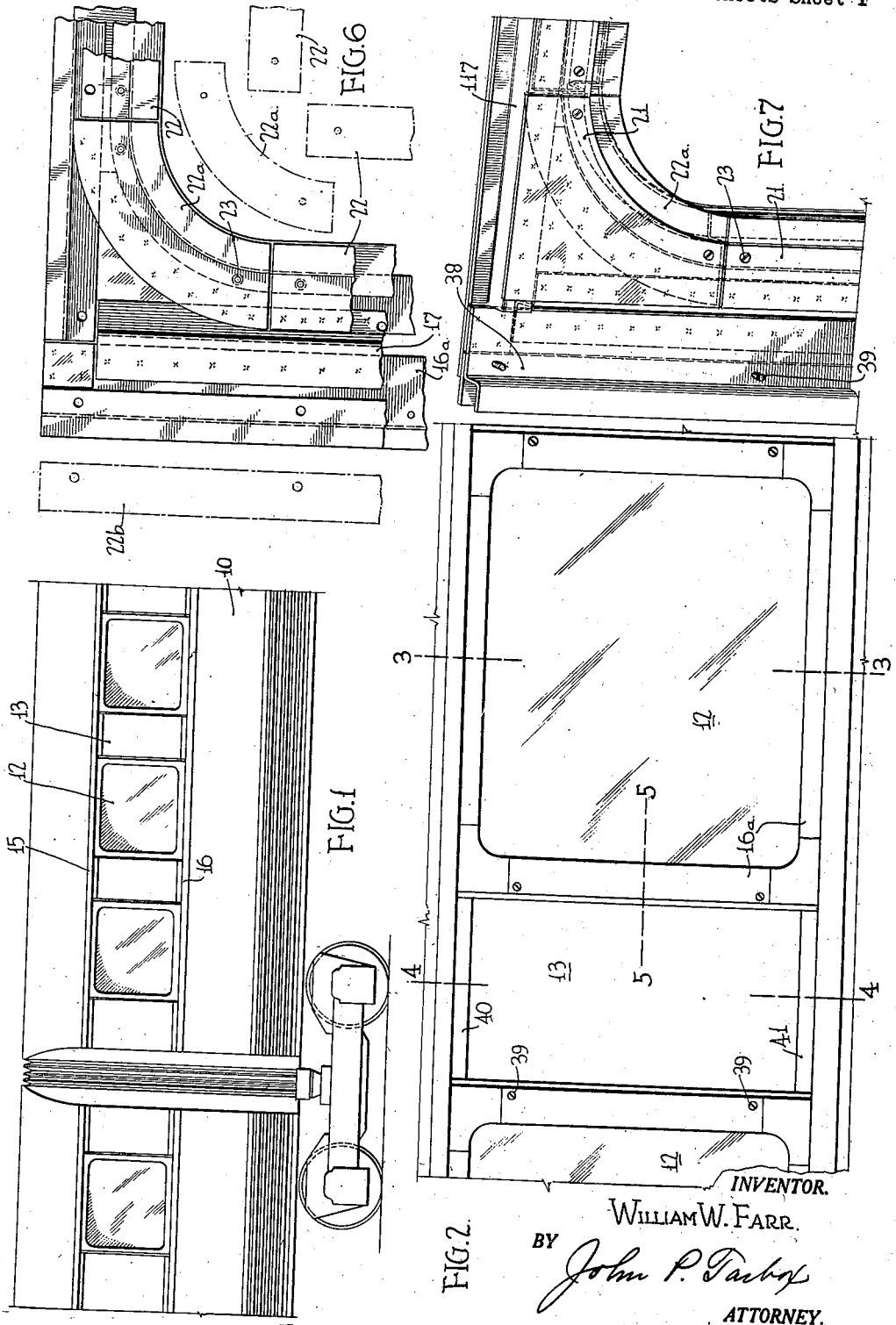

Patented Dec. 26, 1939

2,184,614

UNITED STATES PATENT OFFICE 2,184,614

VEHICLE CONSTRUCTION

William W. Farr, Penn Valley, Pa., assignor to Edward G. Budd Manufacturing Company, Philadelphia, Pa., a corporation of Pennsylvania Application April 7, 1937, Serial No. 135,391

11 Claims. (Cl. 105—329)

This invention relates to improvements in vehicle construction and in particular to improvements in detachable side frame panels for the window frames and deadlight panels.

One of the principal objects of this invention is to provide a detachable side frame panel for securing a window frame of the fixed type and also the adjacent deadlight panels, such construction being readily attached to the vehicle body structure from the inside with the window glazing also readily accomplished from the inside.

Another object of the invention is to provide a fixed type window frame which may be readily made of rolled sections welded together and attachable to the vehicle body by securing means extending through flanges on the side frame posts and mouldings with the window glass carried in a resilient support and firmly held by detachable strips removable from the inside of the vehicle body to expedite replacement by one man, the frame securing means being hidden by internal mouldings.

Another object of the invention is to provide a simplified vehicle side frame structure for securing the windows and deadlight panels in which the frame is of channel cross section with the internal wall directly attached to the post structure of the vehicle body with the glass and deadlights individually supported in insulated, water tight channels formed by extensions of the frame structure.

Further objects and advantages of my invention will appear from the following disclosure of a preferred form of embodiment thereof taken in connection with the attached drawings illustrative thereof and in which, Fig. 1 is a partial side elevation of a vehicle body;

Fig. 2 is a partial outside elevation on an enlarged scale of the window panel and deadlight panel;

Fig. 3 is a vertical section taken substantially along the line 3—3 of Fig. 2 through the window;

Fig. 4 is a vertical section taken substantially along the line 4—4 of Fig. 2 through the deadlight;

Fig. 5 is a horizontal cross section taken substantially along the line 5—5 of Fig. 2 showing the post connection;

Fig. 6 is a detail inside elevation of a corner of the window frame without the interior projecting plate and with the interlock pieces shown in dotted lines in preassembled position;

Fig. 7 is a view similar to Fig. 6 with the parts assembled;

Fig. 8 is a horizontal cross section similar to Fig. 5, but showing a modified form of window frame.

The vehicle body 10 which may be of the rail car type is provided with a plurality of windows 12 spaced by deadlight panels 13 all of which are adapted to be attached and secured to the side frame structure which includes posts 14 as shown in Figs. 3 and 5 and mouldings 15 at the top and bottom which may be of channel shape having flanges 15a. The posts 14 are also preferably of channel shape having laterally extending flanges 14a and the window frame 16 hereinafter described is fixedly secured through said flanges to the car body, being removable only in case of serious accident.

The window frames 16 are of substantially hollow cross section and include an outer plate 16a which is nearly flush with the car body and an internal surface which in this form of embodiment, includes a plurality of Z members 17 and 18 with the inturned flanges 17a and 18a welded together as at 19 and the outturned flanges 17b and 18b welded to the flat plate 16a as at 20. It will of course appear that such a construction might readily be formed of other shapes, one of which is shown in Fig. 8, although the multiple Z member construction is conveniently made of rolled sections of material such as stainless steel and welded together by spot welding.

On the interior of the frame, a projecting strip 21 is secured by welding to the outer flange 17a of the Z member 17, thus providing a space with the flange 18a of the inner Z member 18. The intervening space is filled by the detachable interlock strips 22 which are secured in place by the screws 23.

As shown in Figs. 6 and 7, these interlock strips 22 are preferably straight pieces and are completed by corner pieces 22a, it being understood that two or more pieces might be made integral by welding or by cutting out from a single piece of metal, but ordinarily it is most economical to cut the pieces separately. The interlock strip 22 and the laterally projecting flange 18b of the Z member 18 form a channel shape opening in which is received the rubber insulating strip 24 and the glass 25 carried therein. The removal of the screws 23 and the interlock strips 22 and corner pieces 22a permits the glazing of the window frame and as these interlock strips are on the inside of the body, one man may readily replace a broken sash without difficulty.

The window frame 16 is secured to the post and moulding flanges 14a and 15a by a plurality of attaching screws 30 which may be of the self-tapping variety. As shown in Fig. 3, the screws 30 project through the filler channel 31 at the bottom and the flange 15a of the moulding and thence through the three thicknesses of metal formed by the projecting strip 21 and the overlapped flanges 17a and 18a of the Z spacing members. A similar construction is used at the side frame posts as shown in Fig. 5, although it may be found desirable to use filler strips generally designated at 32 to compensate for side frame gussets, etc. It will be apparent that there is adequate material for rigidly anchoring the screws and it will also be apparent that the hollow space within the spacing Z members will receive the projecting ends of the screws 30. The external surface, therefore, as shown in Fig. 2, will be entirely free from projecting screw heads for the window frame glazing or the window frame attachment.

Internally of the car, certain mouldings are usually necessary including the curtain guides 34 which extend vertically along the posts and a window sill 35 placed at the bottom. At the top there is a curtain roller housing generally indicated at 36. These necessary mouldings cover the screw heads so that there is no objectionable appearance due to the attachment of the window frame from the inside.

The screws 23 which retain the interlock strips 22 do appear from the inside but there is only need for a few of these screws inasmuch as the sash pressure is transverse to the movement of the interlock strips. The appearance of these screws is not objectionable and it facilitates the glazing of the windows if such should be necessary as they may be removed without removing any mouldings which are normally painted and paint retouching is eliminated.

The window frame 16 is wider in horizontal cross section along the vertical post than at the top and bottom and is adapted to extend partially across the open mouth of channel post 14 to anchor the deadlight panels 13. For this purpose a Z member 38 is welded to the flush outer plate 16a through the outturned flange 17b of the Z member 17 in order to form a space to receive the interlock strip 22b which is held by the screws 39. The laterally depending flange of the Z member 38 and the interlock strip 22b serve to form a channel for the reception of the side edges of the deadlight panel and the insulating rubber material 24.

The deadlight panels 13 are anchored top and bottom by tubular strips 40 and 41 which are appropriately secured to the flanges 15a of the mouldings 15 as by a bolt 42 having a T-shape head to fit in a suitable slot. In assembly, the deadlight panels are inserted in the channel formed by the top or bottom strip 40 or 41 which is in position and the other strip engaged over the other edge of the panel and drawn tight by the bolt 42. The panels are then anchored in place by the exterior interlock strips 22b which are mounted externally of the car body as the internal space between windows is usually so covered by lining that it would be very difficult and objectionable to internally detach the panels. There is little occasion to change deadlight panels, however, inasmuch as they are frequently of composite structure and are usually free from damage. The sash is occasionally broken and its replacement must be accomplished in the minimum of time.

It is to be understood that the glass 15 which is represented may be a multiple thickness, non-shatterable glass or of double glazed type by merely changing the proportions of the channel and the depth of the Z spacing members 17 and 18. It is also to be understood that the hollow channel cross section is most effective for welding purposes and that as shown the procedure would be to weld the overlapping flanges of the spacing Z members and the projecting member 21 together and subsequently weld the outturned flanges of the Z to the outer surface plate 16a to which would also be welded the Z member 38. This affords a very simple welding operation and makes it unnecessary to have any exposed securing means and eliminates the necessity of spacers or other superfluous metal.

A modified form of internal channel structure for the window frame is shown in Fig. 8. In this construction, the plate 16a is the same as before, but the spacing members are represented as a single member 50. It has the internal depending flange 50a, the external depending flange 50b, the interlock spacing sections 50c and 50d, and the attaching portion 50e for attachment to the car body. Web portions 50f and 50g serve as spacers for the deadlight panels and windows. Only one additional part is needed and that is 30 the projecting strip 21 heretofore referred to. Such a strip is rather difficult to form but may be desired under some circumstances where numerous small parts and numerous welds are to be avoided or are more expensive than forming the first described structure.

While I have shown preferred forms of embodiment of my invention, I am aware that other modifications may be made to the structure and I therefore desire to include within my invention such other modifications as come within the scope and spirit of the disclosure herein and of the claims appended hereinafter.

What I claim is:

1. In a vehicle of the class described, having a window support formed by the body structure, a window frame adapted to be fixedly secured to said support, said securement including a plurality of headed attaching means projecting through said support and into said frame, and a moulding comprising a curtain guide covering the external heads of said attaching means.

2. In a car body, means to secure a window frame thereto, said window frame being hollow, headed attaching means extending through parts of the car body into the hollow frame and being invisible from the outside, and a plurality of cover members including curtain guides and a sill hiding the heads of said attaching means from internal view.

3. A window frame having a closed hollow cross section with a flat face and a channel shape portion having outwardly turned flanges secured to the face, one of said flanges forming a part of a window glass channel, means to complete the window glass channel, said means including an offset part of the channel shape frame portion, a projecting member secured to said frame portion and spaced from said offset part of the frame portion, an interlock strip in said space and detachable means to retain the interlock strip in place.

4. A window frame for fixed attachment to a vehicle body which comprises an outer plate, a plurality of Z members attached thereto and having overlapping flanges attached to each other and attaching means extending through a part of the body and extending into the overlapping portions of the Z members.

5. A hollow cross section window frame for vehicle bodies comprising a substantially flat outermost plate, a plurality of Z members secured thereto and having overlapping flanges, means to secure said frame to a portion of the body from the interior of the body, and detachable means on the inside of the frame cooperating with a flange of a Z member to form a glass receiving channel.

6. A hollow cross section window frame for vehicle bodies comprising a substantially flat outermost plate, a plurality of Z members secured thereto and having overlapping flanges, a projecting member secured to a flange of one member and forming a restricted space with the adjacent flange of the other member, means to secure the overlapping flange portions of the Z members to a portion of the body from the interior of the body, and detachable interlock strips cooperating with a projecting flange of a Z member to form a glass receiving channel.

7. A hollow cross section window frame for vehicle bodies comprising a substantially flat outermost plate, a plurality of Z members secured thereto by their projecting flanges and having their other flanges overlapping, a projecting member secured to an overlapping flange of one member and forming a restricted space with the overlapping flange of the adjacent member, means to secure the overlapping flange portions of the frame to a portion of the body from the interior of the body, and detachable interlock strips cooperating with a projecting flange of a Z member to form a glass receiving channel, and means on the side of the window frame opposite the glass receiving channel to engage a deadlight panel.

8. A hollow window frame for a vehicle body, said frame having an angular portion on one edge with a laterally extending flange forming a part of a panel securing channel and having an angular portion on the other edge with a laterally projecting flange forming a part of a panel securing channel, means detachable from the inside of the body for completing the first named channel, means on the outside of said frame for completing the second channel and wholly concealed means to secure said window frame to the body from the interior of the body.

9. A window and deadlight panel frame for a vehicle body comprising a substantially flush external plate, a plurality of Z shape members secured thereto, the flanges of certain of said Z members overlapping and adapted to receive an anchoring means for securing the frame to the body, a flange of another Z extending beyond the edge of said external plate and becoming a part of a panel receiving channel.

10. A hollow window frame adapted to be secured to a support which comprises an inner wall having an offset portion, attaching means secured thereto, a retainer strip attached to the inner wall between the wall and support and forming with said offset portion a narrow space with a part of the wall, an interlock strip in said space and projecting beyond the wall to form one side of a panel receiving channel, and an outer wall secured to the inner wall, the region of attachment serving as the completing side of the panel receiving channel.

11. A removable vehicle body window panel having a rectangular frame, said frame comprising vertical side portions each including a main body of hollow cross section having along one side thereof and substantially in the plane of its outer face a fixed flange portion projecting beyond the main body, and having on its opposite side and substantially in the plane of its inner face, a further fixed flange portion projecting beyond the main body and in a direction opposite to said first-named flange portion, and a pair of detachable flanges, one spaced from and forming a channel with each of said fixed flange portions, one of said channels being arranged to receive the margin of a window glass and the other, the margin of a deadlight panel.

WILLIAM W. FARR.